United States Patent
Kim et al.

(10) Patent No.: US 11,394,921 B2
(45) Date of Patent: Jul. 19, 2022

(54) SYSTEMS AND METHODS FOR PERSPECTIVE SHIFTING IN VIDEO CONFERENCING SESSION

(71) Applicant: Apple Inc., Cupertino, CA (US)

(72) Inventors: Jae Hoon Kim, San Jose, CA (US);
Chris Y. Chung, Sunnyvale, CA (US);
Dazhong Zhang, Milpitas, CA (US);
Hang Yuan, San Jose, CA (US);
Hsi-Jung Wu, San Jose, CA (US);
Xiaosong Zhou, Campbell, CA (US);
Jiefu Zhai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 643 days.

(21) Appl. No.: 15/455,890

(22) Filed: Mar. 10, 2017

(65) Prior Publication Data
US 2018/0262714 A1 Sep. 13, 2018

(51) Int. Cl.
*H04N 7/14* (2006.01)
*H04N 7/15* (2006.01)
*G06F 3/0488* (2022.01)
*H04N 13/00* (2018.01)
*H04N 13/239* (2018.01)

(52) U.S. Cl.
CPC .......... *H04N 7/147* (2013.01); *G06F 3/0488* (2013.01); *H04N 7/15* (2013.01); *H04N 13/239* (2018.05); *H04N 2007/145* (2013.01); *H04N 2013/0092* (2013.01)

(58) Field of Classification Search
USPC .................................................... 348/14.07
See application file for complete search history.

(56) References Cited

U.S. PATENT DOCUMENTS

| | | | |
|---|---|---|---|
| 7,564,476 B1* | 7/2009 | Coughlan | H04N 7/147 348/14.08 |
| 9,258,520 B2* | 2/2016 | Lee | H04N 7/141 |
| 2007/0064120 A1* | 3/2007 | Didow | H04N 5/275 348/229.1 |
| 2012/0327172 A1* | 12/2012 | El-Saban | G06T 7/174 348/14.02 |
| 2015/0029294 A1* | 1/2015 | Lin | H04N 7/141 348/14.01 |
| 2015/0195491 A1* | 7/2015 | Shaburov | H04N 7/15 348/14.12 |
| 2018/0103234 A1* | 4/2018 | Ahn | H04N 7/147 |

FOREIGN PATENT DOCUMENTS

EP 2077525 A1 * 7/2009 ........... G06T 3/0012

* cited by examiner

*Primary Examiner* — Amal S Zenati
(74) *Attorney, Agent, or Firm* — BakerHostetler

(57) ABSTRACT

Embodiments of the present disclosure provide systems and methods for perspective shifting in a video conferencing session. In one exemplary method, a video stream may be generated. A foreground element may be identified in a frame of the video stream and distinguished from a background element of the frame. Data may be received representing a viewing condition at a terminal that will display the generated video stream. The frame of the video stream may be modified based on the received data to shift of the foreground element relative to the background element. The modified video stream may be displayed at the displaying terminal.

34 Claims, 11 Drawing Sheets

100

200

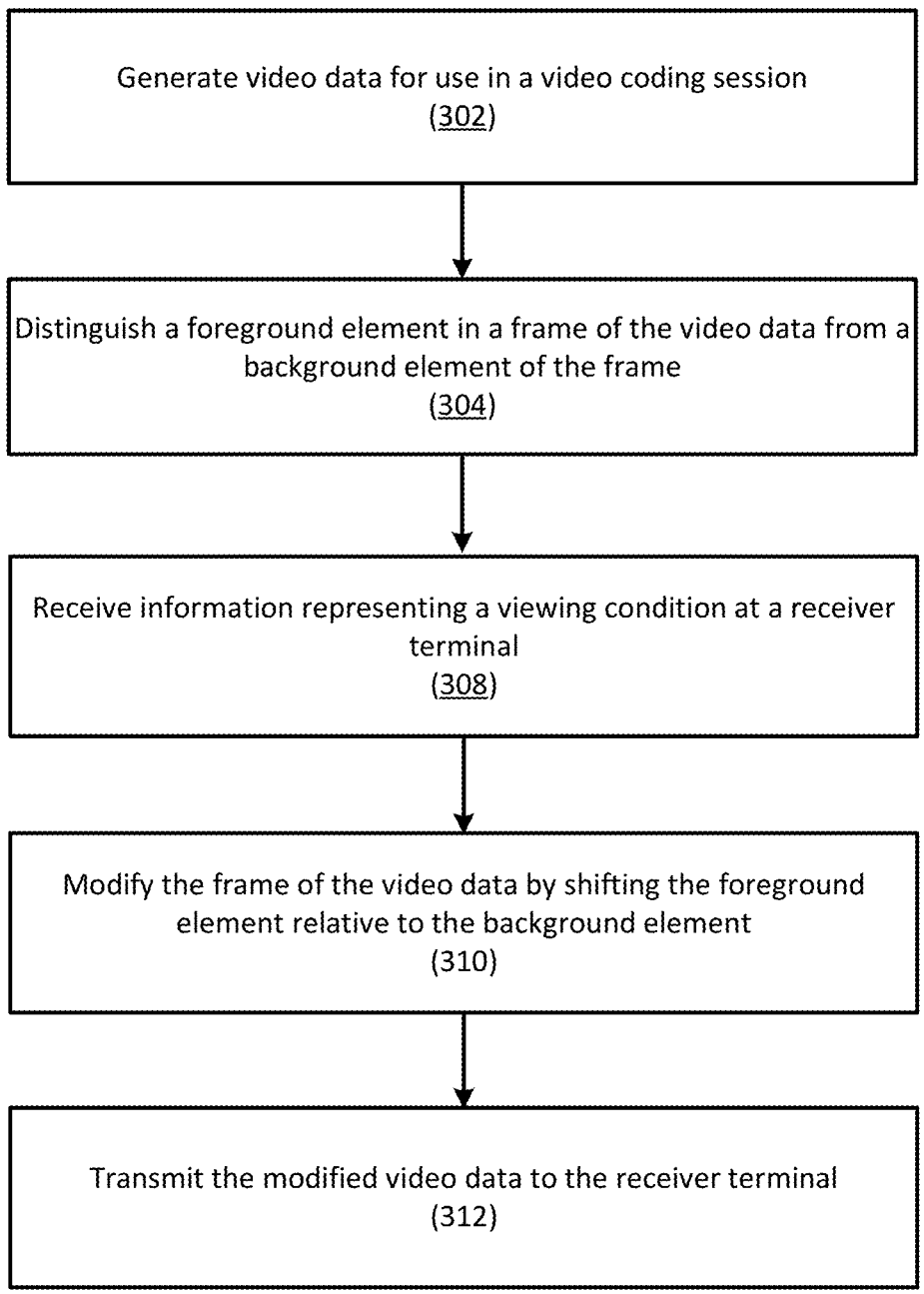

500

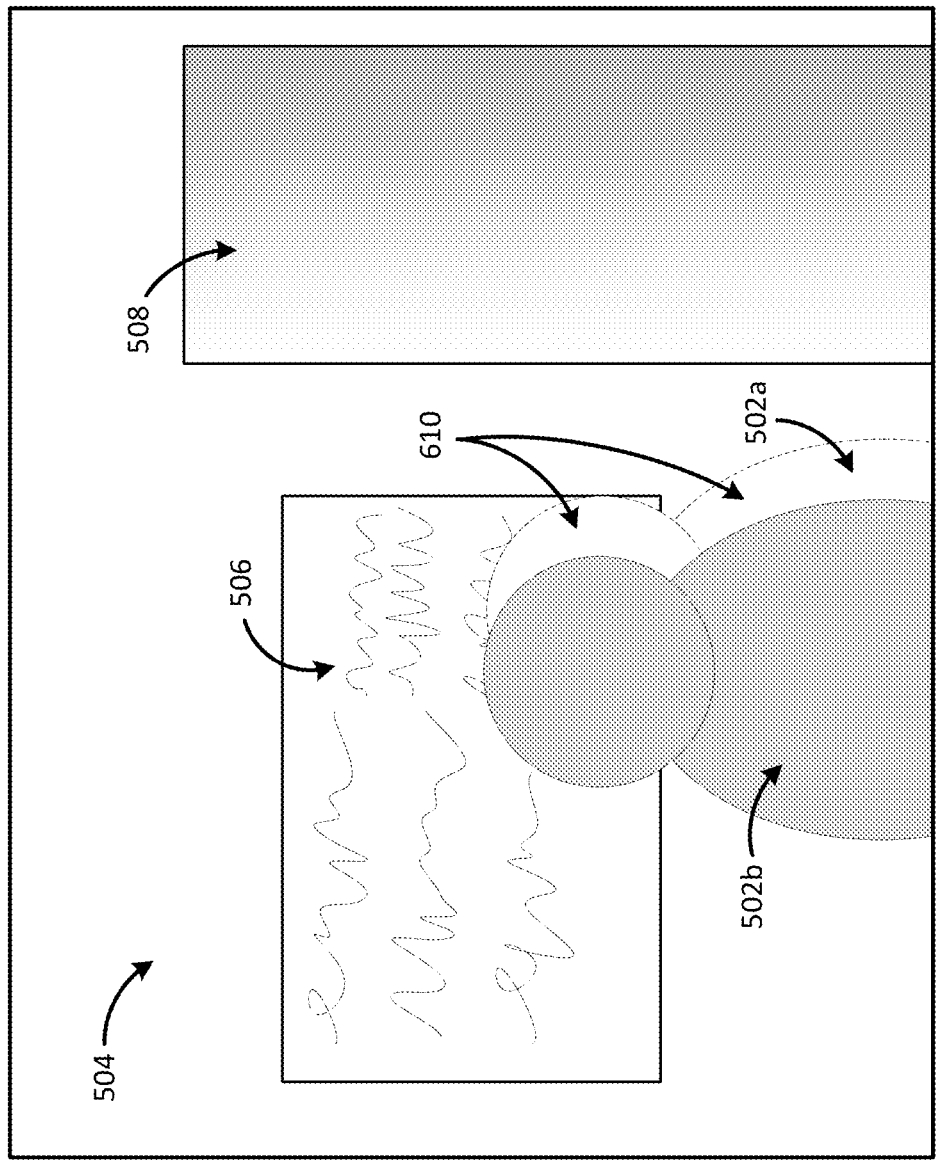
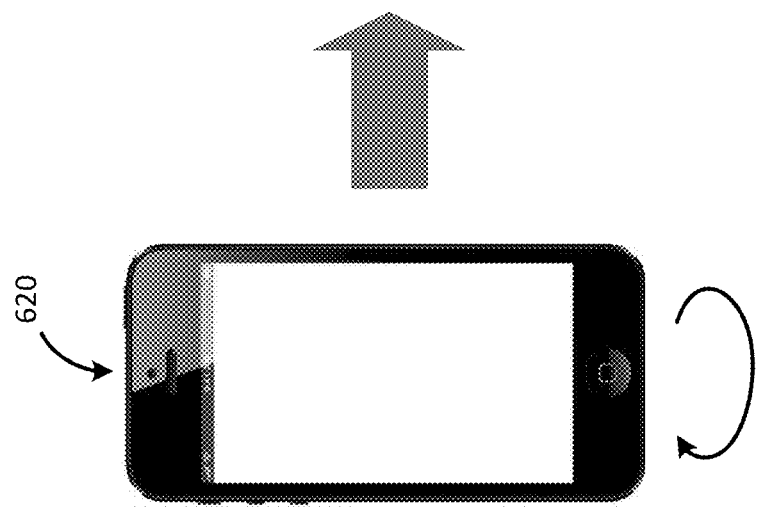
FIG. 6
600

700

900

1000

SYSTEMS AND METHODS FOR PERSPECTIVE SHIFTING IN VIDEO CONFERENCING SESSION

BACKGROUND

The present disclosure relates to video processing and, more particularly, perspective shifting in a video conferencing session.

Video conferencing systems provide services to transmit a video stream from a first device to one or more other devices that participate in a video conferencing session. Oftentimes, the participating devices exchange video data as it is generated by the devices, either by natural imaging systems (cameras) or synthetic imaging systems (graphics generators). Each device typically operates autonomously from the other(s) without regard to viewer perspectives at the other device. Thus, for example, a viewer at one device cannot change image capture operations at another device, for example, to see background content elements that become obscured by foreground objects. To gain view of the background content elements, the viewer typically must request that operators at the capture device move either the foreground element or an image capture device so that the background element may be viewed.

Accordingly, the inventors perceive a need for improved video conference processing to allow viewing operators to manage presentation of foreground and background content elements captured by far-end devices.

BRIEF DESCRIPTION OF THE DRAWINGS

FIG. 3 illustrates a method according to an embodiment of the present disclosure;

FIG. 6 illustrates an example frame of a video stream according to an embodiment of the present disclosure;

DETAILED DESCRIPTION

Embodiments of the present disclosure provide systems and methods for implementing a perspective shift in a video conferencing session. In one example method, a video stream may be generated. A foreground element may be identified in a frame of the video stream and distinguished from background element(s) of the frame. Further, data may be received representing a viewing condition at a terminal that will display the generated video stream. The frame of the video stream may be modified based on the received data to shift the foreground element relative to the background element(s). The modified video stream may be displayed at the displaying terminal.

Figure 1:
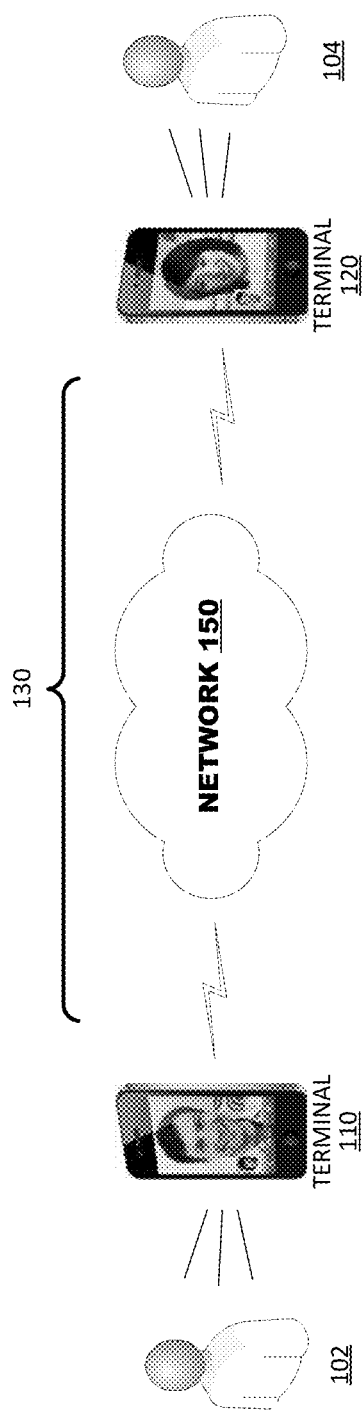
FIG. 1 illustrates a system according to an embodiment of the present disclosure.

FIG. 1 illustrates a system 100 according to an embodiment of the present disclosure. The system 100 may include a pair of terminals 110, 120 that communicate via a channel 130. A first terminal 110, for example, may capture video data of a local environment, which typically includes foreground content elements (here, a representation of an operator 102 of the terminal 110) and background content elements. The first terminal 110 may code the captured video and transmit the coded video to the second terminal 120. The second terminal 120 may decode the coded video and render it locally on the device to an operator 104 of the second terminal. If bidirectional exchange of video is desired, the second terminal 120 may capture video data of its local environment, which may include its own representations of foreground content elements (again, the operator 104) and background content elements. The second terminal 120 may code the captured video and transmit the coded video to the first terminal 110. The first terminal 110 may decode the coded video that it receives and render it locally on the device to the operator 102.

In FIG. 1, the terminals 110, 120 are illustrated as smart phones but the principles of the present disclosure are not so limited. Embodiments of the present disclosure find application with laptop computers, tablet computers, media players and/or dedicated video conferencing equipment. Furthermore, while the present disclosure discusses application of the methods and techniques disclosed herein within the context of video conferencing, such methods and techniques are further applicable to other systems involving video coding. For example, the methods and techniques of the present disclosure may find application in a unidirectional video broadcast platform, such as a live video game streaming platform (e.g., Twitch) in which a live depiction of the player may be superimposed over the gameplay.

The channel 130 represents communication or storage media through which coded video streams are exchanged between the terminals 110, 120. To support real-time unidirectional or bidirectional exchange of video, the channel 130 may be provided by one or more of networks 150 that convey coded video data among the terminals 110, 120, including for example wireline and/or wireless communication networks. A communication network 150 may exchange data in circuit-switched and/or packet-switched channels. Representative networks include telecommunications networks, local area networks, wide area networks and/or the Internet. In another embodiment, the channel 130 may be provided as a storage device (not shown), such as an electrical, optical, or magnetic storage device. For the purposes of the present discussion, the architecture and topology of the channel 130 is immaterial to the operation of the present disclosure unless explained herein below.

Figure 2A:
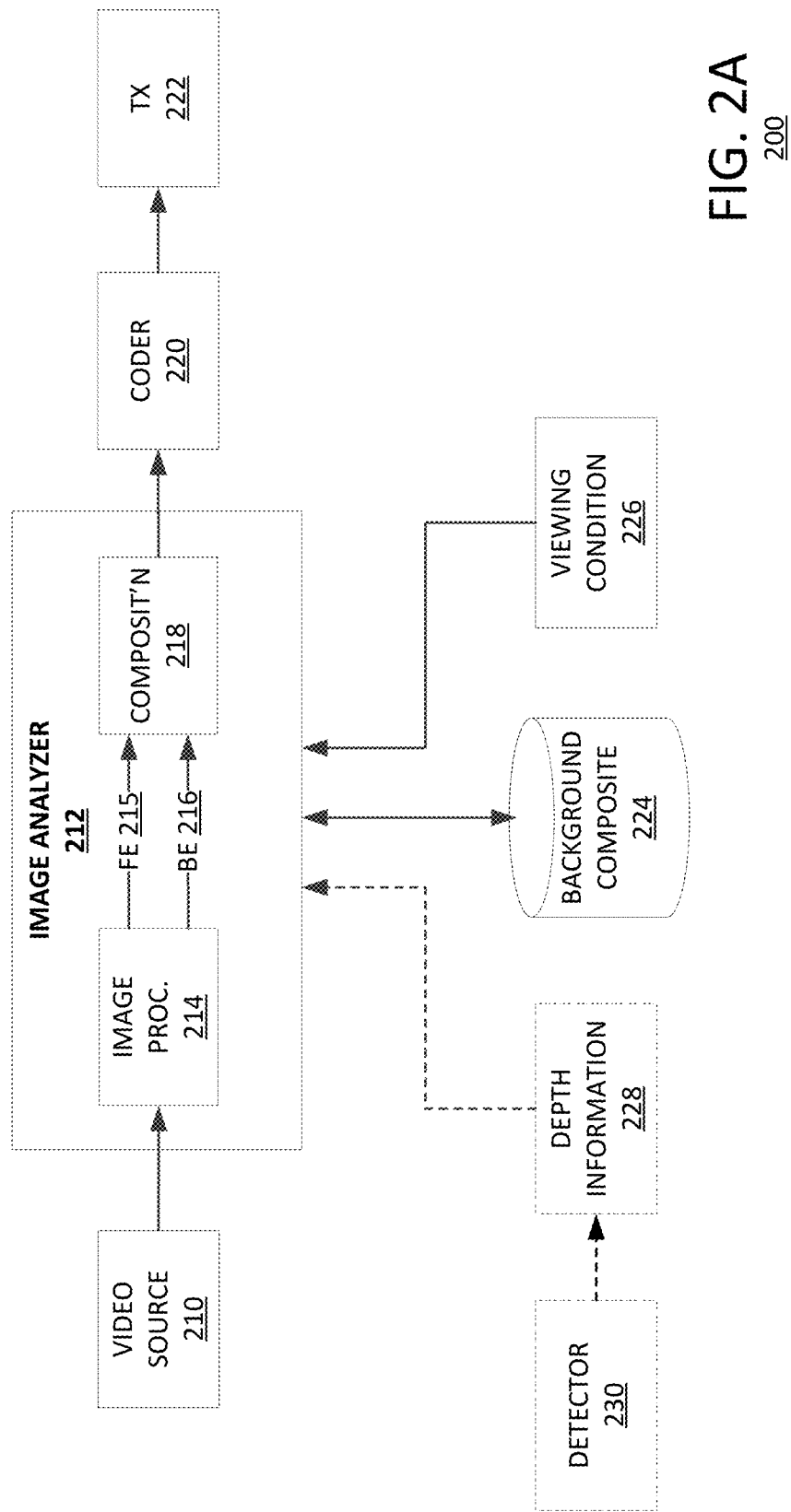
FIG. 2A illustrates a system according to an embodiment of the present disclosure.

FIG. 2A illustrates a system 200 according to an embodiment of the present disclosure. The system 200 may include a video source 210, an image analyzer 212, a coder 220, and a transmitter 222. The video source 210 may generate video data to be processed by the system 200. The image analyzer 212 may include an image processor 214 which parses the video data into one or more foreground elements 215 and one or more background elements 216 to form a composition 218 of the video data. The composition 218 may include a perspective shift between the foreground elements 215 and the background elements 216 and may be based on a background composite 224, depth information 228, and/or viewing condition data 226. The coder 220 may encode the composition 218 of the modified video data according to various video coding algorithms or standards, such as ITU-T H.265. The transmitter 222 may transmit the coded video data to a recipient terminal for decoding and display.

The video source 210 may be embodied in various forms. For example, the video source 210 may comprise one or more cameras that capture the video data. The cameras may be integrated into a common device as the other components of the system 200 or they may be provided as separate devices. As another example, the video source 210 may comprise a computer application, such as a video game, that may execute on a terminal and generate synthetic video content (e.g., computer graphics). The video source 210 may blend synthetic and natural video content as is common in virtual reality and augmented reality applications. For example, the video source 210 may include both video data captured by a camera (e.g., video data depicting an operator) and video data generated by an application (e.g., gameplay video of a video game). The inverse also may occur: Image data of a graphics avatar may be superimposed over natural image data of an operator so that the avatar image appears as an element of an otherwise natural image.

As another example, the video source 210 may comprise a digital storage medium, such as an optical storage medium (e.g., a digital video disc (DVD)), a non-volatile storage medium (e.g., a hard disk drive, a solid-state drive, or flash memory), or a volatile storage medium (e.g., random-access memory (RAM)). As such, the video data provided by the video source 210 need not be live or near live video, but may include video data that was initially generated at a prior time and stored for later processing and encoding according to the methods and techniques disclosed herein.

The depth information 228 may comprise information indicating the respective depths of a foreground element and the background element(s) depicted in the video data. The depth information 228 may be generated by a detector 230 such as a depth sensor, a time-of-flight camera, an infrared detector, a laser rangefinder, or other device configured to measure distance. The detector 230 may be incorporated with or otherwise associated with the video source 210.

The depth information 228, additionally or alternatively, may be determined by the use of a pair of cameras capturing a stereoscopic image or video stream. A stereoscopic image or video stream, for example, may be analyzed for binocular disparity to determine a depth for each element in the image or video stream. In some aspects, the depth information 228 may be determined by an analysis of the video data itself from the video source 210. For example, an object detection technique, as described in greater detail herein, may be used to identify various elements in the video data. The depths of the various elements in the video data may be determined, for example, based on the degree of focus or sharpness of the elements in the video data. As another example, the depth of the elements may be determined based on the relative motion of content between frames of the video data. A parallax effect may be thus recognized between objects represented by the moving content, which may be used to determine depth. Further, the depth of the foreground and/or back element(s) may be determined using an object detection technique.

The viewing condition data 226 may represent an input according to which, at least in part, a perspective shift between foreground and background elements in video data may be implemented. For example, the viewing condition data 226 may represent information indicating a relative orientation of an operator at a terminal that will display the generated video (e.g., the recipient terminal of the transmission from the transmitter 222, such as the second terminal). This may include, for example, the operator tilting the second terminal in free space as if in an attempt to see portions of the background element(s) otherwise occluded by the foreground element. As such, the viewing condition data 226 may indicate a change in relative location (e.g., X, Y, and/or Z coordinates) and/or angle (e.g., roll, pitch, and/or yaw) of a terminal. Such data may be captured by one or more motion sensors (not shown) provided as part of a terminal, such as the second terminal. A motion sensor may comprise, for example, an accelerometer.

The change in relative position and/or angle of a terminal may be with respect to an operator of the terminal. As such, it is contemplated that a terminal may remain stationary while the operator or body part thereof (e.g., head and/or torso) moves or rotates. For example, a camera of the terminal may capture video data with a representation of the operator. The terminal may perform object recognition on the video data to identify the operator in the video data. The terminal then may compare a variation in the positions of the operator over multiple frames of the video data. These variations may be used to determine the movement or rotations of the operator.

The viewing condition data 226 may additionally or alternatively include direct operator input to a terminal, such as touches or swipes on a touch sensitive display of the terminal. For example, the operator of the terminal may touch the left side of the display or perform a right-to-left swipe on the display to indicate a leftward perspective shift of the foreground element relative to the background element(s).

The background composite 224 may include video data, such as from the video source 210, representing background element(s), portions of which may not be portrayed in a present frame of the video data being processed for a potential perspective shift. For example, the background composite 224 may include one or more frames that precede a present frame. As another example, the background composite 224 may include video data captured by multiple cameras oriented at different angles. As such, the video data captured by a first camera may differ from that captured by a second camera. As will be explained in greater detail below, the background composite 224 may serve as a source of image content to fill in portions of the background element(s) exposed by the perspective shift between the foreground and background elements in the processed video data.

As indicated, the image analyzer 212 may receive the video data from the video source 210, the depth information 228, and/or the viewing condition data 226. The image processor 214 may process the received data according to one or more methods and techniques described herein to distinguish the foreground elements 215 and the background elements 216 in the video data. The foreground elements 215 in the video data may be shifted relative to the background elements 216 (or vice versa) to generate the composition 218. As such, the image analyzer 212 may include a compositor (not shown) to further generate the composition 218.

After the image analyzer 212 processes the video data, the coder 220 may encode the modified video data (e.g., the composition 218) according to one or more known video coding algorithms or standards. For example, the modified video data may be encoded according to the ITU-T H.265, or other encoding standard known in the art.

The encoded video data may thereafter be transmitted by the transmitter 222. The encoded video data may be sent to another terminal, at which the encoded video data may be decoded and displayed to the operator of that terminal. The transmitter 222 may communicate with another terminal via the channel 130, including the network 150, described in relation to FIG. 1. For example, the transmitter 222 may be embodied as a radio transmitter configured to transmit data, including the video data, over a wireless network such as a cellular network or a wireless local area network (e.g., Wi-FI). As another example, the transmitter 222 may be embodied as a network interface controller (MC) configured to connect to and communicate over a wired network, such as an Ethernet network.

Figure 2B:
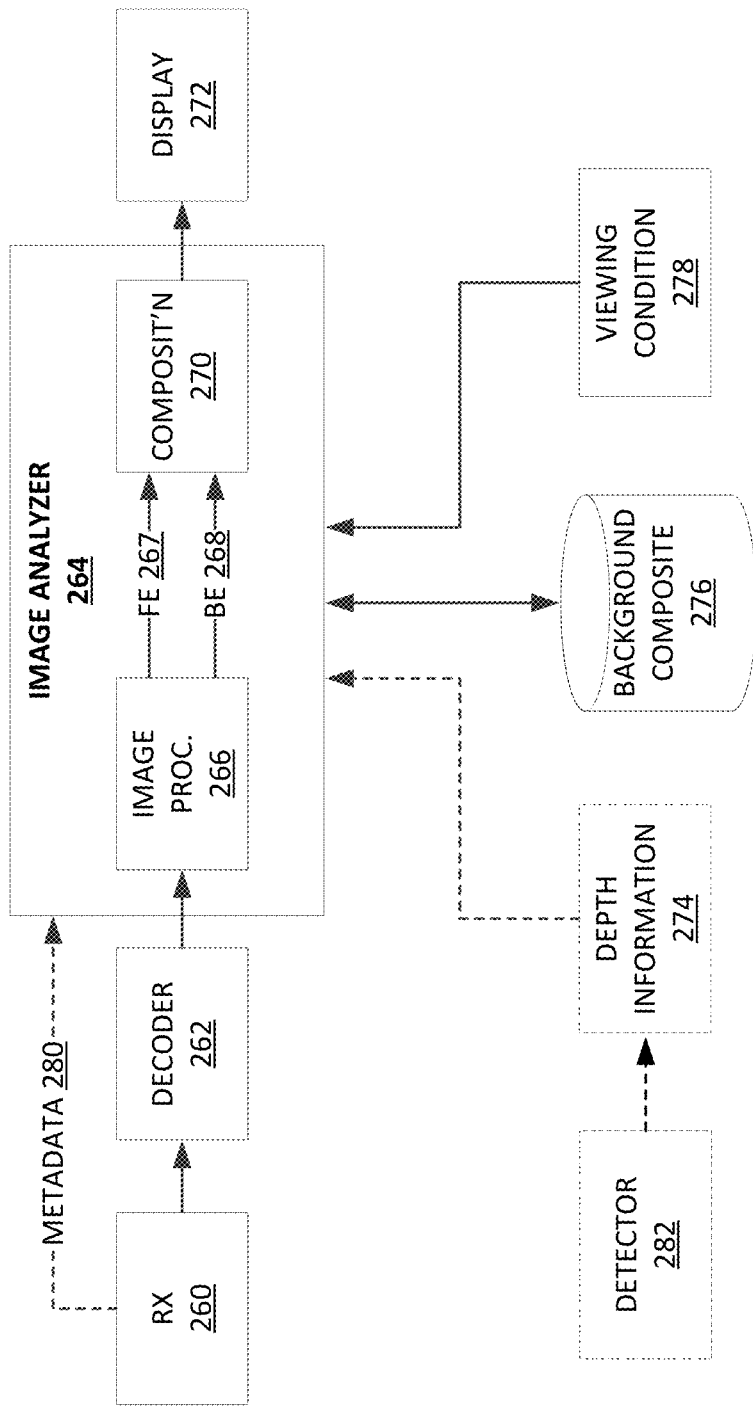
FIG. 2B illustrates a system according to an embodiment of the present disclosure.

FIG. 2B illustrates a system 250 according to an embodiment of the present disclosure. The system 250 may include a receiver 260, a decoder 262, an image analyzer 264, and a display 272. The receiver 260 may receive video data to be processed by the system 250. The received video data may be decoded by the decoder 262. The image analyzer 264 may include an image processor 266 which parses the decoded video data into one or more foreground elements 267 and one or more background elements 268 to form a composition 270. The composition 270 may include a perspective shift between the foreground elements 267 and the background elements 268 and may be based on a background composite 276, depth information 274, and/or viewing condition data 278. The composition 270 may be provided to and displayed by the display 272.

As indicated, the receiver 260 may receive data, including video data, which may have been transmitted by another terminal. As one example, the receiver 260 may be embodied as a radio receiver configured to receive a radio signal carrying data. Such a radio signal may be a cellular signal from a cellular network or a signal from a wireless local area network (e.g., Wi-Fi). In other instances, the receiver 260 may be embodied as a network interface controller (NIC) configured to connect to and receive data from a wired network, such as an Ethernet network.

The received video data may be decoded by the decoder 262. The decoding operation implemented by the decoder may correspond to the coding algorithm or standard used by the coder 220 (FIG. 2A). For example, the video data may be decoded according to the ITU-T H.265, or other coding standard known in the art.

The decoded video data may be processed by the image analyzer 264 according to one or more of the methods and techniques described herein. The image analyzer 264, and components thereof, may be similar in some aspects to the image analyzer 212, and components thereof, described in relation to FIG. 2A. Based at least in part on the depth information 274, the background composite 276, and/or the viewing condition data 278, the image processor 266 may distinguish the foreground elements 267 and background elements 268 in the video data. A perspective shift between the foreground elements 267 and the background elements 268 in the video data may thereafter be implemented to generate the composition 270. As such, the image analyzer 264 may include a compositor (not shown) to generate the composition 270.

The background composite 276 may be similar in some aspects to the background composite 224 described in relation to FIG. 2A. The background composite 276 may include video data, such as that received by the receiver 260, representing background element(s). Portions of the background element(s) in the background composite 276 may include image content that was not included in a present frame of the video data for which the perspective shift is being implemented. For example, the background composite 276 may include one or more frames that precede a present frame. As another example, the background composite 276 may include video data captured by multiple cameras oriented at different angles. The background composite 276 may serve as a source of image content to fill in portions of the background element(s) 268 exposed by the perspective shift between the foreground and background elements 267, 268 in the processed video data.

The viewing condition data 278 may be similar in some aspects to the viewing condition data 226 described in relation to FIG. 2A. As such, the viewing condition data 278 may include an input according to which a perspective shift between foreground and background elements 267, 268 may be implemented. For example, the viewing condition data 278 may include information indicating a relative position or orientation of an operator with respect to the terminal that will display the generated video. For example, the viewing condition data 278 may indicate a change in relative location (e.g., X, Y, and/or Z coordinates) and/or angle (e.g., roll, pitch, and/or yaw) of a terminal. The viewing condition data 278 may additionally or alternatively include direct operator input to a terminal, such as touches or swipes on a touch sensitive display of the terminal.

The depth information 274 may be similar in some aspects to the depth information 228 described in relation to FIG. 2A. As such, the depth information 274 may indicate the respective depths of the foreground elements 267 and the background elements 268. The depth information may be determined by an analysis of the video data received by the receiver 260. For example, the depths of the various elements in the video data may be determined based on a relative degree of focus or sharpness of the elements. As another example, the depth of the elements may be determined based on motion detected between frames of the video data. A parallax effect may be recognized between objects in the video data and may be used to determine depth.

Additionally or alternatively, the depth information 274 may be conveyed as metadata 280 from another terminal. The metadata 280 may be transmitted, for example, with the video data received by the receiver 260. The depth information 274 conveyed as the metadata 280 may include depth information generated by a detector associated with another terminal (e.g., the detector 230 from FIG. 2A). The metadata 280 also may include the background composite 276 generated by another terminal.

In one aspect, the system 200 may be implemented on a terminal (e.g., the first terminal 110 in FIG. 1) that generates the initial video data, performs the perspective shift in the video data, and then transmits the modified video data to a recipient terminal (e.g., the second terminal 120 in FIG. 1). The recipient terminal in such an arrangement may decode the video data and display the resultant decoded video data, without any perspective shifting processing.

In another aspect, the system 250 may be implemented on a terminal (e.g., the second terminal 120) that receives video data that has not been processed by a transmitting terminal (e.g., the first terminal) to implement a perspective shift. In this arrangement, the receiving terminal may perform the processing to implement the perspective shift in the video data (rather than the transmitting terminal) and then display the resultant video data.

In yet another aspect, all or portions of each of the systems 200, 250 may be merged on a single terminal. For example, the single terminal may generate the video data, generate the viewing condition data, the background composite, and/or the depth information, process the video data based on the viewing condition data, the background composite, and/or the depth information to implement the perspective shift, and display the modified video data. This arrangement may be particularly apt in a virtual reality or augmented reality application.

The systems 200, 250 may be implemented by software, hardware, or a combination of software and hardware. For example, the systems 200, 250 or portions thereof may be implemented with software executing on and/or hardware incorporated with one or more of the terminals 110, 120 described in relation to FIGS. 1 and 8. Furthermore, the systems 200, 250 or portions thereof may be implemented as a set of instructions that may be stored on a non-transitory computer-readable medium and executed by a processor.

FIG. 3 illustrates a method 300 according to an embodiment of the present disclosure. The method 300 may begin by generating video data for use in a video coding session (box 302). The method 300 may distinguish a foreground element in a frame of the video data from a background element of the frame (box 304). Further, the method 300 may receive information representing a viewing condition at a receiver terminal (box 306). Thereafter, responsive to the information representing the viewing condition, the method 300 may modify the frame of the video data by shifting the foreground element relative to the background element (box 308). The method 300 may transmit the modified video data to the recipient terminal (box 312).

Generation of the video data (e.g. a video stream) may occur in a variety of ways. It is expected that the method 300 typically will operate on video data captured by cameras, which includes image content of a foreground element and image content of one or more background elements. The method 300, however, also can be performed on computer-generated video data, such as video data output by an application executing on the device that performs the method 300 (for example, a video game). And, further, the method 300 may execute on video data that represents a composite of video data captured by a camera and computer-generated video elements, which might be generated by an application that augments camera video data with computer generated icons or other graphical elements (e.g., an augmented reality application). In such an embodiment, computer generated graphical elements may comprise the foreground element(s) and the video data captured by the camera may comprise the background element(s). In an alternative to this embodiment, the computer generated graphical video elements (e.g., gameplay from a video game) may comprise the background element(s) and the video data captured by the camera (e.g., the video game player) may comprise the foreground element.

The foreground element may include, for example, an operator of the terminal and a participant in a video conferencing session. The background element(s) may include generally those objects behind or in the background of the foreground element. For example, the background element(s) may include the operator's present environment and objects therein. In an aspect, the background element(s) may comprise all elements of the video stream not part of the foreground element and vice versa. As such, the background element(s) may be determined by positively identifying only the foreground element in a frame, wherein the other portions of the frame comprise the background element(s). Conversely, the foreground element may be determined by positively identifying only the background element(s) in a frame, wherein the other portions of the frame comprise the foreground element.

Figure 5:
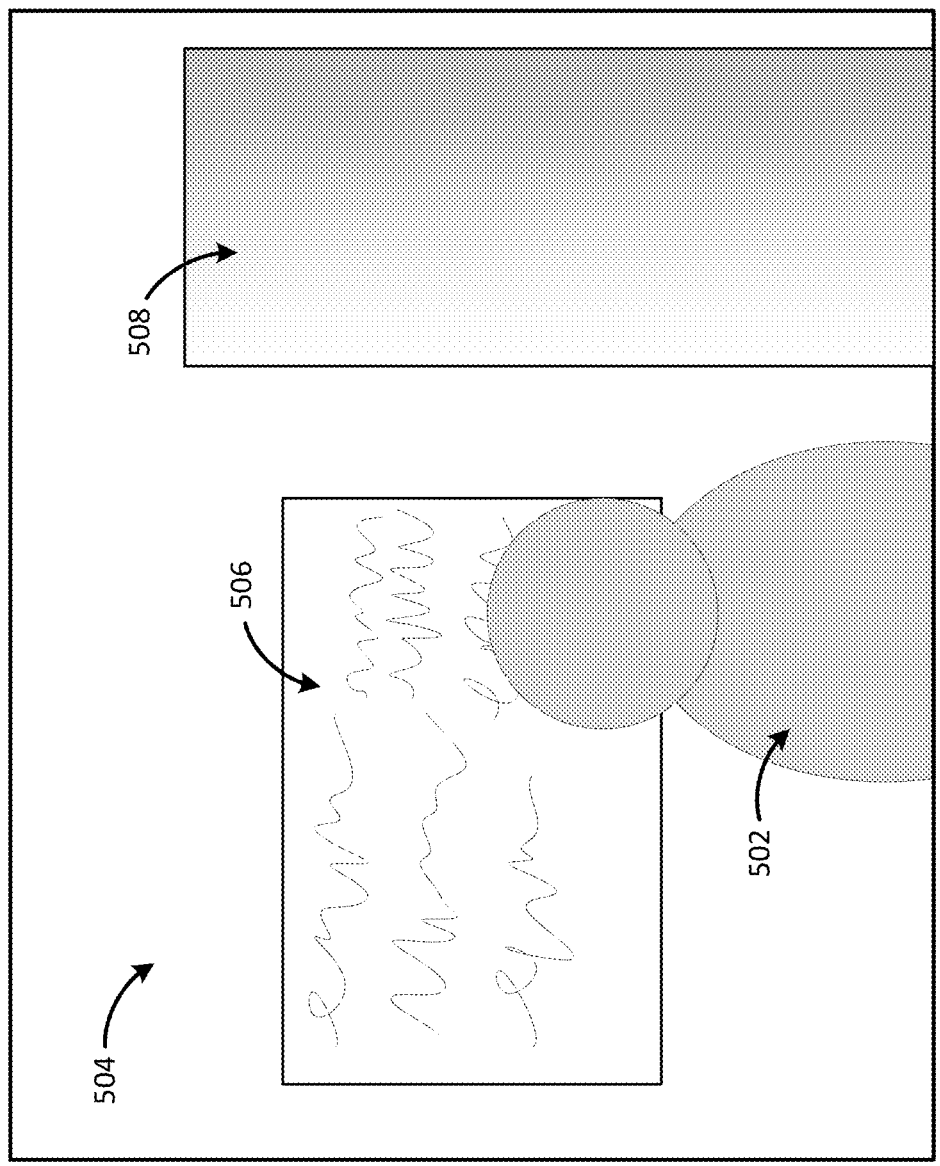
FIG. 5 illustrates an example frame of a video stream according to an embodiment of the present disclosure.

FIG. 5 provides an illustrative example of a frame 500 of a video stream of a video coding session. The frame 500 depicts an operator 502 of a terminal (e.g., the first terminal). The frame 500 further depicts a wall 504, a whiteboard 506 with writing, and a doorway 508 within the operator's 502 environment. In this example frame 500, the operator 502 may be considered a foreground element. The wall 504, the whiteboard 506, and the doorway 508 may be considered background elements.

With attention again to the method 300 of FIG. 3, the foreground element and/or the background element(s) may be distinguished according to one or more of various techniques.

As one example, the foreground and/or the background element(s) in the video data may be identified using an object recognition technique. Specifically, a facial and/or body recognition algorithm may be used to identify one or more operators in the video data. Since the operator is the primary subject of the video chat, portions of the frame of the video data that are identified as corresponding to the operator's head and/or body may comprise the foreground element. Likewise, areas of the frame of the video data that are identified as not corresponding to the operator's head and/or body may comprise the background element.

As another example, the foreground and/or the background element(s) in the video data may be identified using a depth mapping technique. In such a technique, a depth for each pixel or other sub-region of a frame of the video data may be determined (e.g., from the depth information 228, 274 discussed in relation to FIGS. 2A, 2B). The depth may represent a position of the element in the pixel or other sub-region relative to a camera of a terminal. The depth for each pixel or sub-region may be determined, as one example, based on motion detected between frames of the video data. A parallax effect may be recognized between elements in the video data and may be used to determine depth. That is, a difference in relative motion between elements over a series of frames may be determined and used to determine the relative depths between those elements. In embodiments in which a terminal is equipped with a pair of similarly-faced cameras or a dual- or multi-lens camera, stereoscopic video data may be analyzed for binocular disparity to determine a depth for each pixel or other sub-region of a frame of the video data. For instance, a difference in a position of an element in a frame captured by a first camera and a position of the element in a corresponding frame captured by a second camera may be determined. That difference may be used to determine a depth of that element. The stereoscopic video data may also be in an object segmentation technique to distinguish the foreground and background elements.

Such methods of determining depth are merely illustrative and other techniques known in the art may be similarly employed. For example, the various depths of portions of the video data may be determined based on the degree of focus or sharpness of the portion. With the depth of each pixel or other sub-region of the frame of the video stream determined, the foreground and/or the background elements may be identified accordingly. For example, an edge-based range segmentation algorithm may be utilized to identify the foreground and/or background elements based on the determined depth map of the frame of the video data.

As another example, a camera system may perform its own image segmentation to distinguish foreground and background elements. In one application, a camera system may possess two cameras, each of which is designed to capture images in an overlapping field of view but with different image capture parameters. For example, a first camera may be designed to capture image information at a first focus depth (for example as a "zoom" camera) and a second camera may capture image information at a second focus depth (a wide field of view camera). The camera system may perform image segmentation to distinguish foreground and background elements for other purposes. When used with such a camera system, the system 200, 250 (FIGS. 2A, 2B) need not perform image segmentation on their own and simply may exploit image segmentation data output from such camera systems.

Other exemplary techniques by which the foreground and/or background elements may be determined may include edge detection, motion detection, or region-growing methods. The disclosure is not limited to the aforementioned techniques. It is contemplated that other image processing techniques known in the art may be employed to identify the foreground and/or background elements in the video data.

Optionally, the method 300 may determine depth information indicating a relative depth between the foreground element and the background element(s), which may be used as a further basis to modify the frame of the video data by shifting the foreground element relative to the background element. The depth information may comprise, for example, the depth information 228, 274 (FIGS. 2A, 2B). The depth information may be determined according to one or more techniques.

As an example, the relative depth between the foreground element and the background element(s) may be determined by measuring the absolute distance between a reference point, such as a terminal or a depth sensor, and the foreground element and the absolute distance(s) between the reference point and the background element(s). The difference(s) between the respective absolute distances thereby may be calculated to determine the relative depth(s) between the foreground element and the background element(s). The absolute distances between the reference point and the foreground element and/or the background element(s) may be determined using a detector, such as a depth sensor.

As other examples, the depth information indicating a relative depth between the foreground element and one or more background elements may be determined using a pair of cameras configured to capture a stereoscopic image or video stream of the foreground element and the background element(s). Similarly, a dual- or multi-lens camera may be utilized to capture a stereoscopic image or video stream. The stereoscopic image or video stream may be analyzed to ascertain a binocular disparity between the elements. For example, a difference in relative motion between elements (e.g., the foreground and background elements) over a series of frames may be determined and used to determine the relative depths between those elements. As indicated above, the relative depths of the foreground element and the background element(s) may be determined by analyzing the video stream. For example, the degree of focus or sharpness of the elements in the video stream may be indicative of the elements' relative depths. As another example, relative motions of elements may be detected between sequential frames of the video stream (i.e., a parallax effect). The relative motions of the elements across the sequence of frames may be used to determine the relative depths of the foreground and background element(s).

The information representing viewing conditions at a receiver terminal may comprise the viewing condition data 226, 278 (FIGS. 2A, 2B). The viewing condition data may be transmitted by the receiver terminal (e.g., the second terminal 120 of FIG. 1) to a transmitting terminal (e.g., the terminal capturing the video data, such as the first terminal 110 of FIG. 1) via the channel 130 (FIG. 1).

Figure 4:
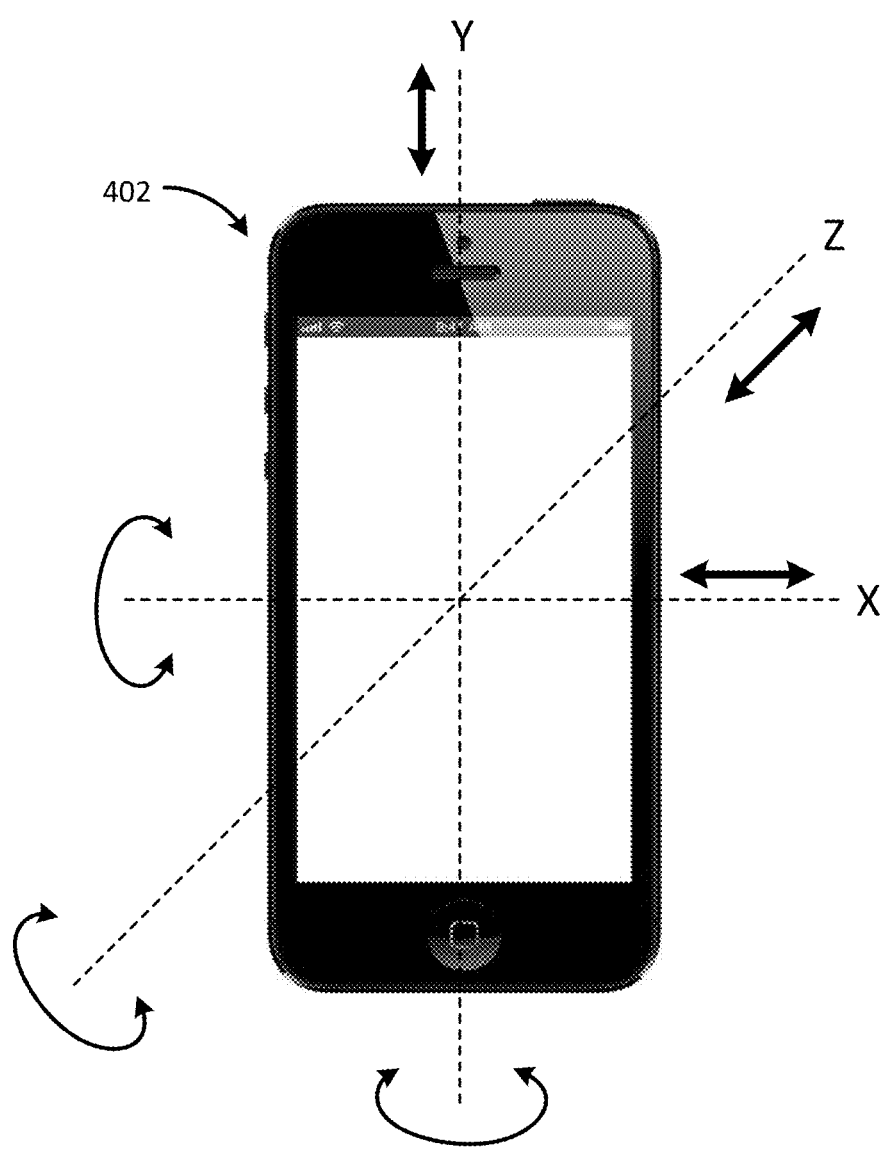
FIG. 4 illustrates an example terminal according to an embodiment of the present disclosure.

The viewing condition data may include a change in the relative positions of the receiver terminal and the operator of the receiver terminal. For example, FIG. 4 depicts a terminal 402 (e.g., the first or second terminal 110, 120 of FIG. 1) embodied as a smart phone. A change in position of the terminal 402 may include movement of the terminal 402 along the X, Y, and/or Z axes, as indicated by the respective arrows. The Y axis may generally correspond to the vertical or up-and-down direction with respect to an operator. Accordingly, in the smart phone embodiment of the terminal 402, the Y axis may coincide with the longitudinal axis of the terminal 402. The X axis may generally correspond to the horizontal or side-to-side direction with respect to an operator. The Z axis may generally correspond to a direction normal to the operator (e.g., the direction toward or away from the operator).

Additionally or alternatively, the change in position of the terminal 402 may include a change in an angle (e.g., pitch, yaw, and/or roll) of the terminal 402, particularly in relation to the operator. A change in pitch may include a rotation about the X axis, which, if the operator is holding the terminal 402 with the display facing him or her, entails a back or forth tilt of the terminal 402. A change in yaw may include a rotation about the Y axis, which, if the operator is again holding the terminal 402 with the display facing him or her, entails a left or right swivel of the terminal 402. Finally, a change in roll may include a rotation about the Z axis, which, if the operator is holding the terminal 42 with the display facing him or her, entails a side to side pivot of the terminal 402 (i.e., the terminal 402 pivots with the plane of the display face remaining parallel to its starting orientation).

The relative change in position and/or angle of a terminal with respect to an operator may be effectuated by the terminal remaining stationary while the operator moves and/or changes his or her viewing angle to the terminal. The viewing condition data does not necessarily have to represent an explicit or purposeful input, but may additionally or alternatively represent an incidental input. For example, as an operator holds a terminal (e.g., a smart phone or tablet computer), the terminal may experience minor relative position and/or angle changes due to the natural, inadvertent movements of the operator's hand and/or head.

Referring back to FIG. 3, the viewing condition data additionally or alternatively may include a direct input to a terminal by the operator. For example, the operator may perform a touch or swipe input to a touch sensitive display of a terminal. In an aspect in which a terminal is embodied as a gaming console, the direct input may include an input from a game controller, such as a directional input from the game controller's directional pad or thumbstick. In another aspect in which a terminal is embodied as a stand-alone video conferencing system, the direct input may include an input from a remote control.

As indicated, the generated video data may be modified, based at least in part on the viewing condition data, to shift the foreground element relative to the background element(s). Optionally, as noted, the modification of the video data may be further based on the depth information indicating the relative depths of the foreground and background elements. For example, the foreground element may be moved to the left or right, up or down, or a combination thereof while the background element(s) remain in their original position. Alternatively, the shift of the foreground element relative to the background element(s) may include shifting the background element(s) while the foreground element remains in its original position.

Which direction(s) to shift the foreground element may be based on the viewing condition data from the recipient terminal.

For example, viewing condition data indicating that the recipient terminal has been swiveled from right to left (i.e., a clockwise yaw rotation of the terminal is performed while the operator remains stationary) may result in the foreground element being shifting to the left relative to the background element(s). Such a shift may be observed in FIG. 6, which will be discussed in greater detail with respect to FIGS. 5-7. Accordingly, the recipient terminal operator may be able to see those background objects previously obscured by the left portion of the foreground element. Further, the background objects just to the right of the foreground element and previously visible to the recipient terminal operator may be now obscured from view by the right portion of the foreground element. This may emulate the effect that would occur if the operator of the recipient terminal and the operator of the transmitting terminal were actually face to face and the recipient terminal operator moved slightly to the left.

As another example, the viewing condition data may indicate that the recipient terminal operator moved vertically upward relative to the recipient terminal. In turn, the foreground element in the modified video stream may be moved vertically downward in relation to the background element(s). The recipient terminal operator then may be able to see in the modified video data those background elements that were previously obscured by the top of the transmitting terminal operator's head and/or shoulders. Similar to that described above, this modification may emulate the recipient terminal operator raising himself or herself up or standing up relative to the transmitting terminal operator, as if the two operators were actually face to face.

The distance of the relative shift between the foreground element and background element(s) may be based on the relative depth between the foreground element and the background element(s). In the aforementioned examples, the distance that the foreground element is shifted to the left or upward may be determined based on the relative depth between the foreground element and the background elements. A greater relative depth may result in a correspondingly greater shift of the foreground element relative to the background element(s), similar to what would occur in a face to face interaction between the operators of the first and second terminals. Conversely, a lesser relative depth may result in a correspondingly lesser shift of the foreground element relative to the background element(s).

The distance of the relative shift between the foreground element and the background element(s) may be further based on the viewing condition data from the recipient terminal. For example, the distance of the shift may be based on the degree or distance by which the recipient terminal is repositioned, rotated, tilted, and/or swiveled. A greater or lesser degree or distance that the recipient terminal is repositioned, rotated, tilted, and/or swiveled may result, respectively, in a greater or lesser distance by which the foreground element is shifted relative to the background element(s).

Similarly, the distance of the foreground element shift may be based on viewing condition data embodied as a direct input to the recipient terminal. For example, a longer or shorter swipe to a touch sensitive display of the recipient terminal may result, respectively, in a greater or lesser distance by which the foreground element is shifted.

Another example which may affect the distance of the foreground element shift may include the magnitude of a movement of an analog thumbstick on a game controller. As yet another example, the distance of the foreground element shift may include a degree of pressure or a time length of a touch input to a touch sensitive display of a terminal. Another example includes an offset distance of a touch sensitive display input relative to a central vertical (e.g., the Y axis) or horizontal (e.g., the X axis) axis of the display. A greater offset distance (e.g., near the top, bottom, or side edge of the display) or lesser offset distance (e.g., near the center of the display relative to the top, bottom, or side edges of the display) from the central axis may result in a correspondingly greater or lesser, respectively, distance of a shift of the foreground element.

As indicated by the above examples, shifting the foreground element relative to the background element(s) may result in the foreground element obscuring some portions of the background element(s) while exposing other portions of the background element(s). Yet, because the newly exposed portions of the background element(s) were obscured by the foreground element in the unmodified frame of the video data, one or more various techniques may be employed to derive new image content for a background element revealed by the perspective shift. For example, the newly exposed portions of the background element(s) may be filled in with image content from the background composite 224, 276 (FIGS. 2A, 2B).

Image content to fill the exposed portion of the background element(s) in a present frame may be determined or estimated based on video data not included in the present frame, which may comprise the background composite 224, 276. This may include other video data generated by the transmitting terminal. For example, multiple cameras associated with the transmitting terminal may have been used to generate the original video data. As such, video data from additional angles may have been captured by the multiple cameras and portions of that video data may correspond with the exposed portions of the background elements. The video data from the additional angles may be used to fill in the exposed portions of the background element(s) caused by the perspective shift of the foreground element. This may be accomplished by identifying the pixels (or block of pixels) in the present frame that are within the exposed portions of the background elements. The pixels in the corresponding frame from the background composite that correspond with the exposed pixels in the present frame may be identified. The image content from the identified pixels in the frame from the background composite may be used to replace the empty image content of the corresponding exposed pixels.

As another example of using video data not included in the present frame, another frame of the video data may be relied on to provide the exposed portion of the background element(s) in the modified video data. The another frame of the video data may include a frame prior to or after the present frame. This technique may be particularly apt if the foreground element and/or the transmitting terminal (or associated component, such as a camera) has moved over a sequence of frames including the present frame. Thus, exposed portion of the background element(s), which were otherwise obscured by the foreground element, may be provided by one or more of the other frames (e.g., prior and/or later frames) of the video data. Again, this may be accomplished by identifying the pixels of the exposed portions of the background elements and replacing the image content thereof with image content from corresponding pixels of a corresponding frame from the background composite.

In the event that the above or other techniques to fill the exposed portion of the background element(s) are insufficient to completely fill the exposed portion with relevant image content, the shift of the foreground element relative to the background element(s) may be limited accordingly. This may comprise estimating an amount of background content that can be derived from the background composite, including background content from other frames of the video data. The distance of the shift may be determined based on the estimated background content that can be derived. For example, if the shift of the foreground element is initially determined, according to the viewing condition data and/or depth information, to be a shift of ten pixels to the right and if image content is only available to fill in the portions of the background element(s) exposed by a five pixel shift, the shift of the foreground element may be limited to five pixels. The limitation of the shift of the foreground element may include clipping the shift or scaling the shift. This maximum shift (e.g., the five pixels in the preceding example) may be communicated to the recipient terminal, such as to effectuate smooth perspective shifting.

A shift of the foreground element relative to the background element(s) may comprise a shift of the foreground element while the background element(s) remain stationary in the frame and/or a shift of the background element(s) while the foreground element remains stationary in the frame.

The modified video data with the shifted foreground element may be encoded prior to transmittal to the recipient terminal. For example, the encoding may include a compression process according to one of any known compression standards, such as H.264 or H.320. The encoded video data may then be transmitted to the recipient terminal where the modified video data may be decoded and viewed by an operator of the recipient terminal.

The steps of identifying the foreground and background elements in the video data, determining depth information, modifying the video data to implement a perspective shift of the foreground element, or any combination thereof may be performed by either the transmitting terminal or the recipient terminal. For example, the transmitting terminal may generate the video data and transit that video data to a recipient terminal. The recipient terminal may process that video data to identify the foreground and background elements, determine the depth information (e.g., based on the video data itself), and modify the video data to implement the perspective shift of the foreground element. As another example, the transmitting terminal may generate the video data, identify the foreground and background elements, determine the depth information (e.g., via a detector of the transmitting terminal), and transmit the video data, along with the identifications of the foreground and background elements and the depth information, to the recipient terminal. The recipient terminal may then use this data, as well as the viewing condition data to the recipient terminal, to modify the video data and implement the perspective shift of the foreground element.

Figure 7:
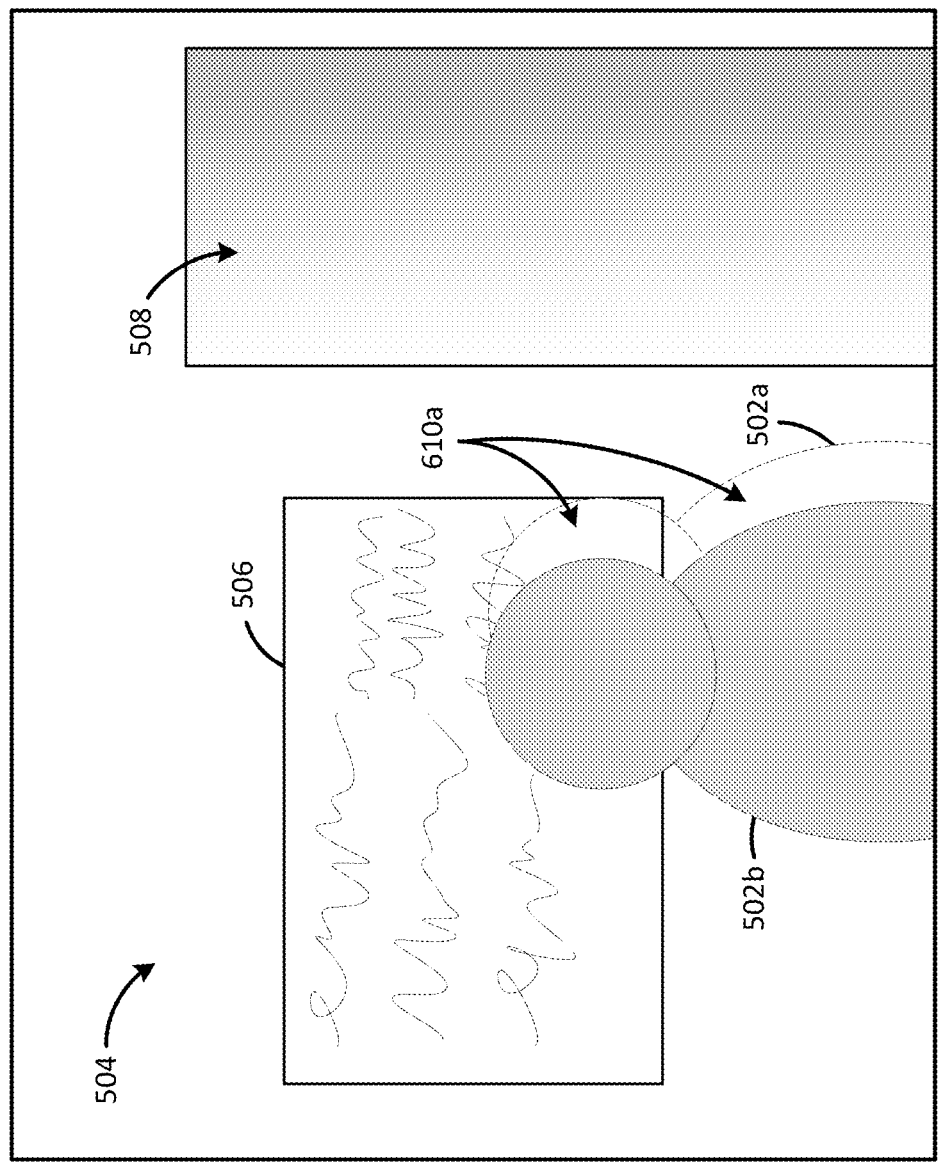
FIG. 7 illustrates an example frame of a video stream according to an embodiment of the present disclosure.

FIGS. 5-7 illustrate an example use case of effectuating a perspective shift of a foreground element relative to background element(s) in video data, based at least in part on viewing condition data from a recipient terminal and, optionally, depth information indicating the relative depths of the foreground element and the background element(s). As indicated above, FIG. 5 illustrates a frame 500 of video data generated by a transmitting terminal. A foreground element is determined and comprises an operator 502 of the transmitting terminal. Background elements are determined and comprise a whiteboard 506 with writing, a wall 504, and a doorway 508.

FIG. 6 illustrates a frame 600 of the video data modified from the frame 500 of FIG. 5. In particular, a recipient terminal 620 is swiveled clockwise about its Y axis (not shown) as if in an attempt to see portions of the background elements otherwise occluded by the foreground element. For example, the operator of the recipient terminal 620 may wish to see the portions of the whiteboard 506 obscured by the right side of the operator. Additionally or alternatively, this swiveling of the recipient terminal 620 may be inadvertent and a natural result of the operator holding the recipient terminal 620 in his or her hand. This swiveling of the recipient terminal 620 comprises the viewing condition data transmitted to and received by the transmitting terminal.

Further, although not explicitly depicted in FIGS. 5-7, the respective depths of the operator 502 (i.e., the foreground element) and the wall 504, whiteboard 506, and doorway 508 (i.e., the background elements) are each determined according to one or more of the techniques described in greater detail herein. For example, a depth of the operator 502 may be determined to be five feet from a depth sensor associated with the transmitting terminal. The depths of the wall 504, the whiteboard 506, and the doorway 508 may be determined to each be eight feet from the depth sensor. Accordingly, the relative depth between the operator 502 and the wall 504, whiteboard 506, and doorway 508 may be determined to be three feet. The absolute depths and/or the calculated relative depth may comprise the depth information.

Based at least in part in the operator input from the recipient terminal 620 and the determined depth information, the operator 502 is shifted horizontally to the left. The initial position of the operator 502 is labeled as 502a and the shifted position of the operator 502 is labeled as 502b. Yet, portions 610 of the background elements, particularly the portions of the whiteboard 506 (and writings thereon) and the wall 504, are left without image content as a result of the shift of the operator 502.

FIG. 7 illustrates a frame 700 of the video data further modified from the frame 600 of FIG. 6. To rectify the portions 610 (FIG. 6) of the background elements lacking image content due to the shift of the operator 502, the portions 610a, shown in FIG. 7, of the background elements are filled in with image content. In particular, the portions 610a of the background that are filled in with image content include portions of the whiteboard 506 with writing and portions of the wall 504. This may be accomplished according to one or more of such techniques described in greater detail herein, such as using video data from multiple cameras and/or using video data from prior or later frames (e.g., the background composite 224, 276 of FIGS. 2A, 2B).

After the portions 610a of the background elements are filled in with image content, the modified video may be coded according to a compression algorithm and transmitted to the recipient terminal 620 (FIG. 6). The recipient terminal 620 may receive the coded video data, decode the video data, and display the decoded video data, including the perspective shift of the foreground element, to the operator of the recipient terminal 620.

The systems and methods described herein may also find use in augmented reality applications. In one example augmented reality application, an operator may use a forward facing (i.e., facing generally away from the operator) camera of a terminal to capture video data, such as video data of the operator's environment in front of him or her. In another example augmented reality application, an operator may use a backward facing (i.e., facing generally towards the operator) camera of a terminal to capture video data, such as video data of the operator's face.

In an augmented reality application, video data captured by a camera of a terminal may comprise one or more background elements. Video data in an augmented reality application may also comprise computer generated elements. The computer generated elements may be rendered on top of the background elements captured by the camera and therefore may comprise the foreground elements of the video data. The video data captured by the camera of the terminal may be real-time or near real-time with respect to when it is seen by an operator. A three dimensional (3-D) space may be defined based on the captured background elements and the computer generated foreground elements. The 3-D space may be leveraged to determine and/or define the depths of the various background and foreground elements.

Viewing condition data may be received to effectuate a perspective shift. Although, in an augmented reality application, the viewing condition data may be derived from an input received or otherwise performed by the same terminal as that capturing the background elements and executing the augmented reality application. Accordingly, a system implementing an augmented reality application of the perspective shifting methods and techniques described herein may include just a single terminal. However, an augmented reality system may also be implemented with more than one terminal. The viewing condition data used in an augmented reality application may be similar to those described in detail herein. For example, the operator may adjust the position of the terminal relative to his or her body or face and/or the operator may perform a rotation of the terminal. The operator also may perform a direct input to the terminal, such as a touch or swipe input to a touch sensitive display of the terminal.

In a similar manner to that described above, the viewing condition data, and optionally the depth information on the captured background elements and computer generated foreground elements, may be used to shift one or more of the computer generated foreground elements relative to the background elements in the modified video data. The modified video data thereafter may be displayed to the terminal operator.

In one alternative embodiment, a foreground element may comprise a 3-D model, such as a 3-D model of an operator's face and/or body. Viewing condition data may be provided in a similar fashion as described herein. Yet, in addition or in alternative to the 3-D model being shifted vertically and/or horizontally, the 3-D model (i.e., the foreground element) may be rotated according to the viewing condition data. For example, an operator may swivel the terminal from right to left in a clockwise manner. Based on this input, the video data may be modified to correspondingly swivel the 3-D model in a clockwise direction. The swivel of the 3-D model may expose or more clearly depict the features and details of the right portion of the 3-D model. For instance, if the 3-D model is a 3-D model of an operator's head, the right side (from the perspective of a viewer; or the left side from the perspective of the operator) of the operator's head may be more fully exposed to the viewer.

In another alternative embodiment, the viewing condition data may indicate a desired zoom-in or zoom-out operation with respect to a foreground or background element. For example, viewing condition data indicating a zoom-in operation may comprise an operator (e.g., the recipient terminal operator) moving his or her body and/or face closer to the terminal, or vice versa (e.g., a relative position change on the Z axis shown in FIG. 4). Conversely, viewing condition data indicating a zoom-out operation may comprise the operator moving his or her body and/or face away from the terminal, or vice versa. Based on such an input, the video data may be modified to effectuate a zoom-in or zoom-out operation on the foreground and/or background elements.

In another alternative embodiment, a blur effect may be applied to one or more of the background element(s). For example, sharpness and/or focus of the background element(s) may be decreased while the sharpness and/or focus of the foreground element remains constant. This may draw attention to the foreground element (e.g., the operator) while the background elements are blurred, de-emphasizing those background elements in the resultant video data. Such a blurring technique may further result in increased compression of the modified and coded video data, which may decrease the data size of the video data and reduce bandwidth costs.

Further, one or more regions of interest may be determined, such as among multiple foreground elements. In the case that the video data includes a plurality of determined foreground elements, one or more of the plurality may be identified as a region of interest. This region of interest may be determined according to which of the plurality of foreground elements (via a facial recognition algorithm, for example) represents an operator face. The foreground element representing the operator face may comprise the region of interest. Other methods of determining the region of interest may include a depth comparison among the foreground elements, with the nearest foreground element being considered the region of interest, for example. The portions of the video data other than the region of interest may be blurred, as described above.

It has been observed that the various perspective shifting methods and techniques described herein provide one or more advantages. For example, the various perspective shifting methods and techniques provide a visually attractive parallax effect in the resultant video data, which may help a video conference participant remain engaged and attentive to the video conference. The various perspective shifting methods and techniques may further provide a sense of depth between the depicted participant in the video conference and his or her background, allowing another participant to gain a better understanding of the environment in which the other participant is present. Another advantage provided by the perspective shifting methods and techniques is that a viewing participant, by providing an input, may be able to see image content otherwise obscured by the depicted participant.

Figure 8:
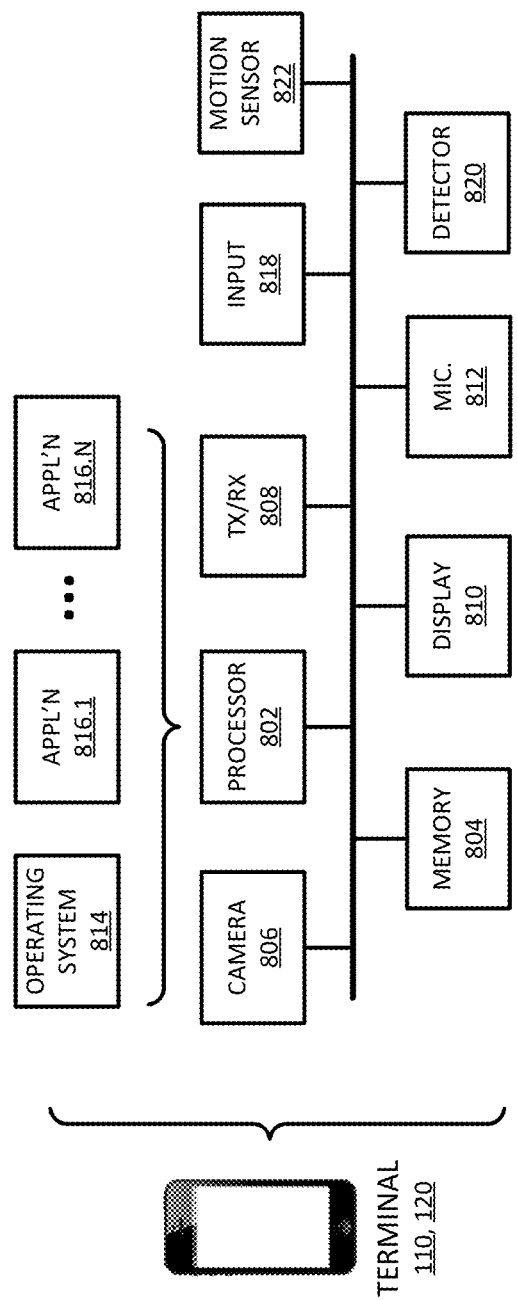
FIG. 8 illustrates an example terminal according to an embodiment of the present disclosure.

FIG. 8 illustrates a simplified block diagram of the terminals 110, 120 (FIG. 1) according to an embodiment of the present disclosure. Each terminal 110, 120 may be embodied as a computing device, such as mobile device (e.g., smart phone, laptop, or tablet computer) or a stationary computing device (e.g., a personal computer, a gaming console, or a set-top digital media player). A personal computer or other type of computing device may include a main hardware unit as well as attached peripherals, such as an external camera (e.g., a "webcam") and/or an external microphone. The several terminals 110, 120 do not necessarily have to comprise the same type of computing device.

For example, the first terminal 110 may comprise a smart phone and the second terminal 120 may comprise a personal computer.

Each of the terminals 110, 120 may be configured with a processor 802 and memory 804. The memory 804 may store an operating system 814 and one or more applications 816.1-816.N that may perform various operations relating to perspective shifting described herein. For example, the one or more applications 816.1-816.N may include a video conferencing application that receives a video stream and encodes and/or otherwise processes the video stream, such as performing a perspective shift on a foreground element, before sending the video stream to an analogous video application running on another terminal. Conversely, the video chat application may receive the video stream from another terminal, decode the video stream, and cause the video stream to be displayed to the operator. The operating system 814, applications 816.1-816.N, and other functionality disclosed herein may be executed by the processor 802.

Each of the terminals 110, 120 may further include a camera 806 and a microphone 812. The camera 806 may be pointed at the operator 102, 104 or other subject and capture a video stream of the operator 102, 104 or other subject. The video stream from the camera 806 may accordingly be provided to the video chat application for encoding or other processing. The camera 806 may be incorporated into the terminal 110, 120, such as is typically the case with a smart phone or tablet computer, or may be separate from but connected to the main body of the terminal 110, 120. For example, the camera 806 may be embodied as an external camera (e.g., a "webcam") that is connected to a personal computer. In some aspects, the terminals 110, 120 may each include multiple cameras 806. For example, the terminal 110, 120 may include a pair of similarly-faced cameras 806 that together capture a stereoscopic video stream. A stereoscopic video stream may be useful in determining the depths of objects in the video stream which, in turn, may aid in distinguishing a foreground object (e.g., an operator) from the background. The microphone 812 may capture audio, such as the voice of an operator participating in a video chat. The captured audio may be provided to the video chat application. The video chat application may synchronize and combine the audio with the video stream from the camera 806. As used herein, unless indicated otherwise explicitly or by context, reference to a video stream or the like may include a video stream with an audio component or a video stream without an audio component.

Each of the terminals 110, 120 may further include a transceiver 808 to effectuate communication with the network 150 and other terminals. The transceiver 808 may include a wireless and/or a wired communication interface to effectuate said communication. For example, the transceiver 808 may include a Wi-Fi interface to communicate with a Wi-Fi access point. As another example, the transceiver 808 may include a cellular communication interface to enable communication over a cellular network. As yet another example, the transceiver 808 may include an network interface controller (NIC) with an Ethernet adapter for connecting to a wired Ethernet network.

Each of the terminals 110, 120 may yet further be configured with a display 810. The display 810 may be used, for example, to enable interaction with the video chat application, as well as to view the video stream provided by the video chat application. The display 810 may be incorporated with the terminal 110, 120, as is commonly the case with a smart phone or tablet computer, and may include an LCD (liquid crystal display). In other aspects, the display 810 may be a separate connected component to the main hardware unit. For example, the display 810 may include an LCD or LED (light emitting diode) computer monitor connected to a personal computer. An input mechanism 818 may further be provided with the terminals 110, 120 to facilitate interaction by the operator 102, 104. The input mechanism 818 may include a touch-sensitive screen, a keyboard, or a mouse or other pointing device, as some examples.

Each of the terminals 110, 120 may include a detector 820, such as a depth sensor. The detector 820 may be used to measure a distance between the detector 820 (or generally the terminal 110, 120) and an object. Each of the terminals 110, 120 may further include a motion sensor 822, such as a accelerometer. The motion sensor 822 may be used, for example, to detect that the position and/or orientation of the terminal 110, 120 in a free space has changed.

Figure 9:
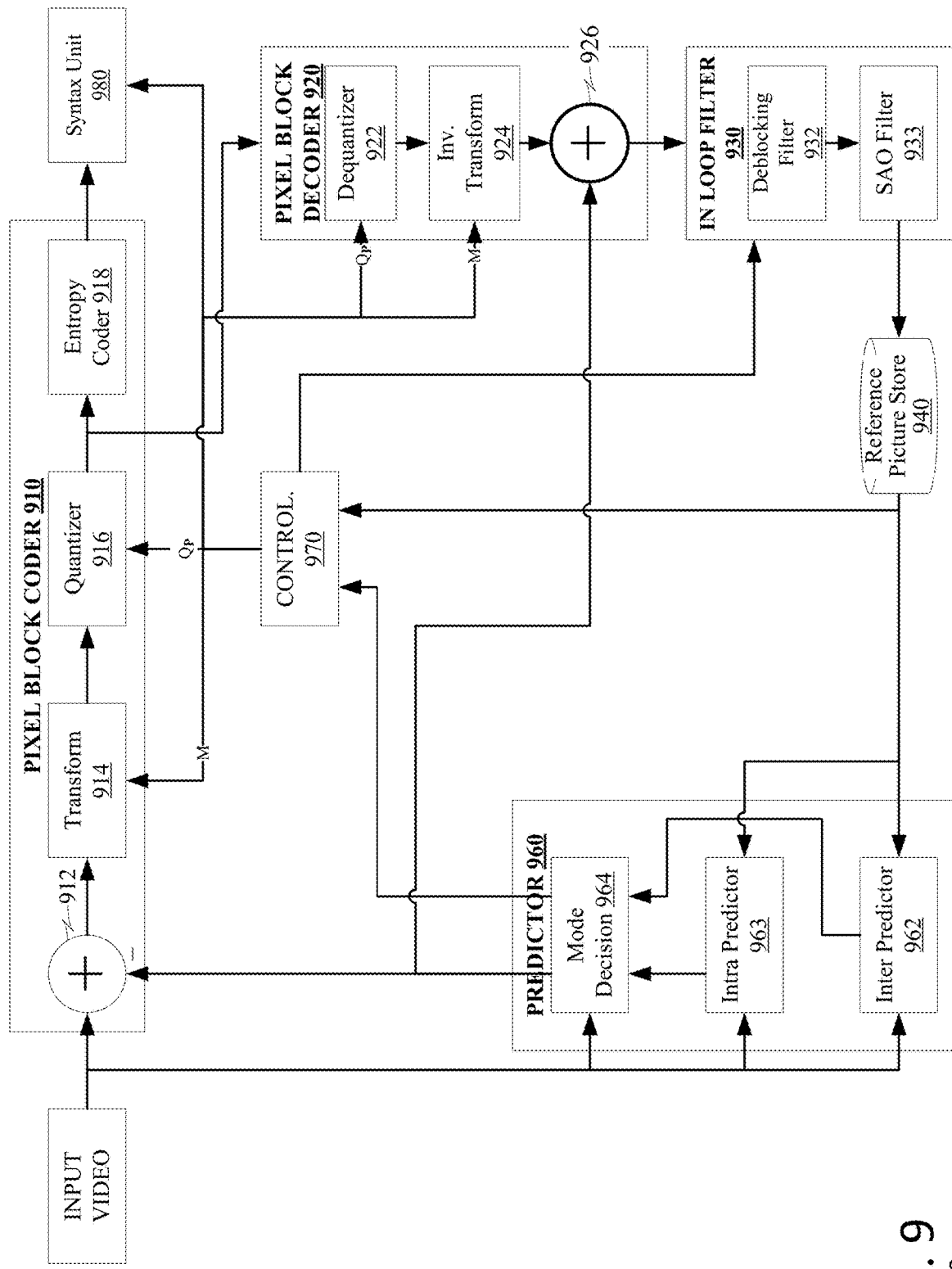
FIG. 9 illustrates a coding system according to an embodiment of the present disclosure.

FIG. 9 is a functional block diagram of a coding system 900 according to an embodiment of the present disclosure. For example, the coder 220 (FIG. 2A) may be implemented as the coding system 900. The system 900 may include a pixel block coder 910, a pixel block decoder 920, an in-loop filter 930, a reference picture store 940, a predictor 960, a controller 970, and a syntax unit 980. The pixel block coder and decoder 910, 920 and the predictor 960 may operate iteratively on individual pixel blocks of a picture. The predictor 960 may predict data for use during coding of a newly-presented input pixel block. The pixel block coder 910 may code the new pixel block by predictive coding techniques and present coded pixel block data to the syntax unit 980. The pixel block decoder 920 may decode the coded pixel block data, generating decoded pixel block data therefrom. The in-loop filter 930 may perform various filtering operations on a decoded picture that is assembled from the decoded pixel blocks obtained by the pixel block decoder 920. The filtered picture may be stored in the reference picture store 940 where it may be used as a source of prediction of a later-received pixel block. The syntax unit 980 may assemble a data stream from the coded pixel block data which conforms to a governing coding protocol.

The pixel block coder 910 may include a subtractor 912, a transform unit 914, a quantizer 916, and an entropy coder 918. The pixel block coder 910 may accept pixel blocks of input data at the subtractor 912. The subtractor 912 may receive predicted pixel blocks from the predictor 960 and generate an array of pixel residuals therefrom representing a difference between the input pixel block and the predicted pixel block. The transform unit 914 may apply a transform to the sample data output from the subtractor 912, to convert data from the pixel domain to a domain of transform coefficients. The quantizer 916 may perform quantization of transform coefficients output by the transform unit 914. The quantizer 916 may be a uniform or a non-uniform quantizer. The entropy coder 918 may reduce bandwidth of the output of the coefficient quantizer by coding the output, for example, by variable length code words.

The transform unit 914 may operate in a variety of transform modes as determined by the controller 970. For example, the transform unit 914 may apply a discrete cosine transform (DCT), a discrete sine transform (DST), a Walsh-Hadamard transform, a Haar transform, a Daubechies wavelet transform, or the like. In an embodiment, the controller 970 may select a coding mode M to be applied by the transform unit 915, may configure the transform unit 915 accordingly and may signal the coding mode M in the coded video data, either expressly or impliedly.

The quantizer 916 may operate according to a quantization parameter $Q_P$ that is supplied by the controller 970. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The pixel block decoder 920 may invert coding operations of the pixel block coder 910. For example, the pixel block decoder 920 may include a dequantizer 922, an inverse transform unit 924, and an adder 926. The pixel block decoder 920 may take its input data from an output of the quantizer 916. Although permissible, the pixel block decoder 920 need not perform entropy decoding of entropy-coded data since entropy coding is a lossless event. The dequantizer 922 may invert operations of the quantizer 916 of the pixel block coder 910. The dequantizer 922 may perform uniform or non-uniform de-quantization as specified by the decoded signal $Q_P$. Similarly, the inverse transform unit 924 may invert operations of the transform unit 914. The dequantizer 922 and the inverse transform unit 924 may use the same quantization parameters $Q_P$ and transform mode M as their counterparts in the pixel block coder 910. Quantization operations likely will truncate data in various respects and, therefore, data recovered by the dequantizer 922 likely will possess coding errors when compared to the data presented to the quantizer 916 in the pixel block coder 910.

The adder 926 may invert operations performed by the subtractor 912. It may receive the same prediction pixel block from the predictor 960 that the subtractor 912 used in generating residual signals. The adder 926 may add the prediction pixel block to reconstructed residual values output by the inverse transform unit 924 and may output reconstructed pixel block data.

The in-loop filter 930 may perform various filtering operations on recovered pixel block data. For example, the in-loop filter 930 may include a deblocking filter 932 and a sample adaptive offset ("SAO") filter 933. The deblocking filter 932 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 930 may operate according to parameters that are selected by the controller 970.

The reference picture store 940 may store filtered pixel data for use in later prediction of other pixel blocks. Different types of prediction data are made available to the predictor 960 for different prediction modes. For example, for an input pixel block, intra prediction takes a prediction reference from decoded data of the same picture in which the input pixel block is located. Thus, the reference picture store 940 may store decoded pixel block data of each picture as it is coded. For the same input pixel block, inter prediction may take a prediction reference from previously coded and decoded picture(s) that are designated as reference pictures. Thus, the reference picture store 940 may store these decoded reference pictures.

As discussed, the predictor 960 may supply prediction data to the pixel block coder 910 for use in generating residuals. The predictor 960 may include an inter predictor 962, an intra predictor 963 and a mode decision unit 962. The inter predictor 962 may receive spherically-projected pixel block data representing a new pixel block to be coded and may search spherical projections of reference picture data from store 940 for pixel block data from reference picture(s) for use in coding the input pixel block. The inter predictor 962 may support a plurality of prediction modes, such as P mode coding and B mode coding. The inter predictor 962 may select an inter prediction mode and an identification of candidate prediction reference data that provides a closest match to the input pixel block being coded. The inter predictor 962 may generate prediction reference metadata, such as motion vectors, to identify which portion(s) of which reference pictures were selected as source(s) of prediction for the input pixel block.

The intra predictor 963 may support Intra (I) mode coding. The intra predictor 963 may generate prediction reference indicators to identify which portion of the picture was selected as a source of prediction for the input pixel block.

The mode decision unit 962 may select a final coding mode to be applied to the input pixel block. Typically, as described above, the mode decision unit 962 selects the prediction mode that will achieve the lowest distortion when video is decoded given a target bitrate. Exceptions may arise when coding modes are selected to satisfy other policies to which the coding system 900 adheres, such as satisfying a particular channel behavior, or supporting random access or data refresh policies. When the mode decision selects the final coding mode, the mode decision unit 962 may output a non-spherically-projected reference block from the store 940 to the pixel block coder and decoder 910, 920 and may supply to the controller 970 an identification of the selected prediction mode along with the prediction reference indicators corresponding to the selected mode.

The controller 970 may control overall operation of the coding system 900. The controller 970 may select operational parameters for the pixel block coder 910 and the predictor 960 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 980, which may include data representing those parameters in the data stream of coded video data output by the system 900. The controller 970 also may select between different modes of operation by which the system may include metadata identifying the modes selected for each portion of coded data.

During operation, the controller 970 may revise operational parameters of the quantizer 916 and the transform unit 915 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 970 may control operation of the in-loop filter 930 and the predictor 960. Such control may include, for the predictor 960, mode selection (lambda, modes to be tested, search windows, distortion strategies, etc.), and, for the in-loop filter 930, selection of filter parameters, reordering parameters, weighted prediction, etc.

Figure 10:
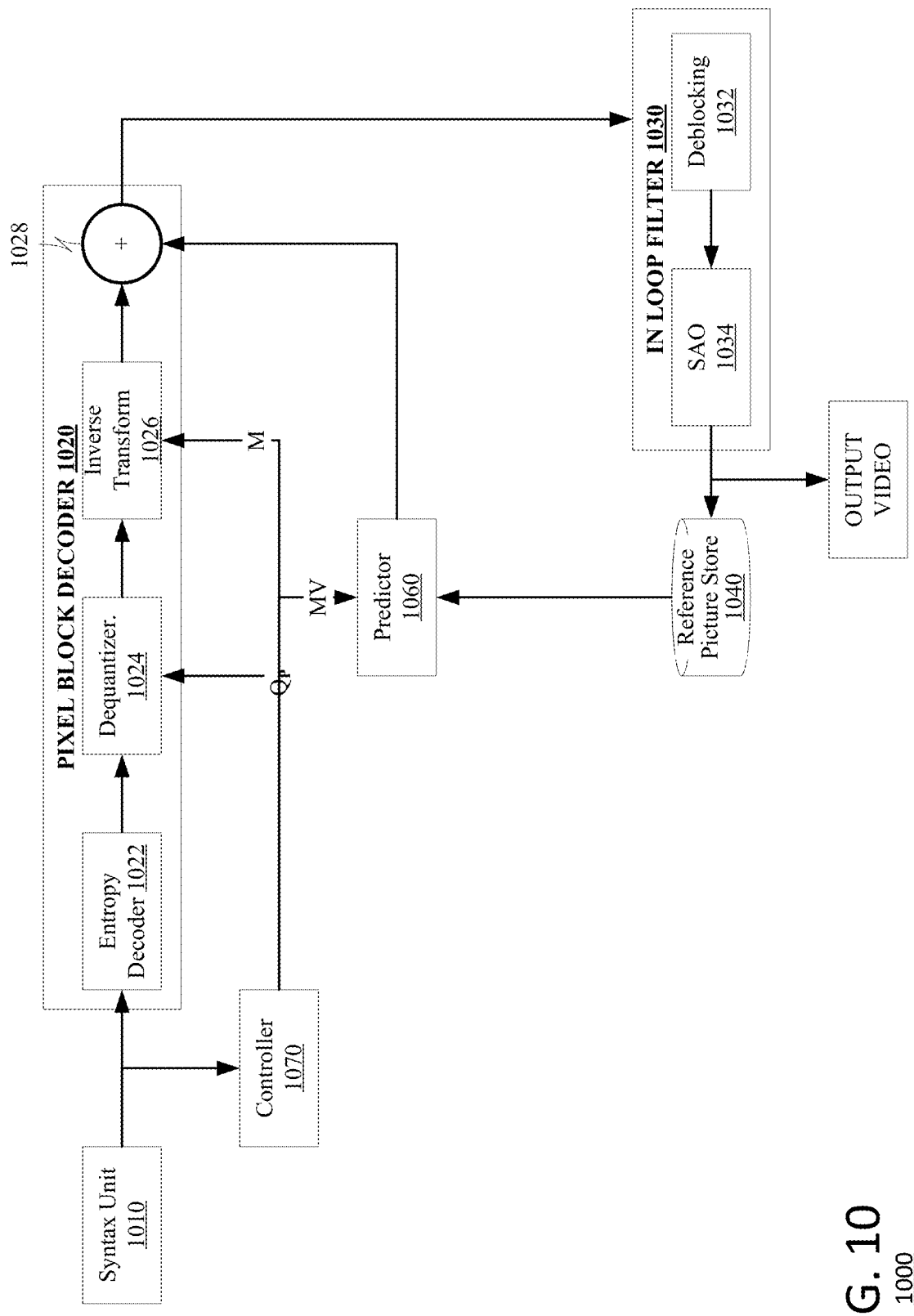
FIG. 10 illustrates a decoding system according to an embodiment of the present disclosure.

FIG. 10 is a functional block diagram of a decoding system 1000 according to an embodiment of the present disclosure. For example, the decoder 262 (FIG. 2B) may be implemented as the decoding system 1000. The decoding system 1000 may include a syntax unit 1010, a pixel block decoder 1020, an in-loop filter 1030, a reference picture store 1040, a predictor 1060, and a controller 1070. The syntax unit 1010 may receive a coded video data stream and may parse the coded data into its constituent parts. Data representing coding parameters may be furnished to the controller 1070 while data representing coded residuals (the data output by the pixel block coder 910 of FIG. 9) may be furnished to the pixel block decoder 1020. The pixel block decoder 1020 may invert coding operations provided by the pixel block coder 910 (FIG. 9). The in-loop filter 1030 may filter reconstructed pixel block data. The reconstructed pixel block data may be assembled into pictures for display and output from the decoding system 1000 as output video. The pictures also may be stored in the reference picture store 1040 for use in prediction operations. The predictor 1060 may supply prediction data to the pixel block decoder 1020 as determined by coding data received in the coded video data stream.

The pixel block decoder 1020 may include an entropy decoder 1022, a dequantizer 1024, an inverse transform unit 1026, and an adder 1028. The entropy decoder 1022 may perform entropy decoding to invert processes performed by the entropy coder 918 (FIG. 9). The dequantizer 1024 may invert operations of the quantizer 916 of the pixel block coder 910 (FIG. 9). Similarly, the inverse transform unit 1026 may invert operations of the transform unit 914 (FIG. 9). They may use the quantization parameters $Q_P$ and transform modes M that are provided in the coded video data stream. Because quantization is likely to truncate data, the data recovered by the dequantizer 1024, likely will possess coding errors when compared to the input data presented to its counterpart quantizer 916 in the pixel block coder 910 (FIG. 9).

The adder 1028 may invert operations performed by the subtractor 912 (FIG. 9). It may receive a prediction pixel block from the predictor 1060 as determined by prediction references in the coded video data stream. The adder 1028 may add the prediction pixel block to reconstructed residual values output by the inverse transform unit 1026 and may output reconstructed pixel block data.

The in-loop filter 1030 may perform various filtering operations on reconstructed pixel block data. As illustrated, the in-loop filter 1030 may include a deblocking filter 1032 and an SAO filter 1034. The deblocking filter 1032 may filter data at seams between reconstructed pixel blocks to reduce discontinuities between the pixel blocks that arise due to coding. SAO filters 1034 may add offset to pixel values according to an SAO type, for example, based on edge direction/shape and/or pixel level. Other types of in-loop filters may also be used in a similar manner. Operation of the deblocking filter 1032 and the SAO filter 1034 ideally would mimic operation of their counterparts in the coding system 900 (FIG. 9). Thus, in the absence of transmission errors or other abnormalities, the decoded picture obtained from the in-loop filter 1030 of the decoding system 1000 would be the same as the decoded picture obtained from the in-loop filter 930 of the coding system 900 (FIG. 9); in this manner, the coding system 900 and the decoding system 1000 should store a common set of reference pictures in their respective reference picture stores 940, 1040.

The reference picture store 1040 may store filtered pixel data for use in later prediction of other pixel blocks. The reference picture store 1040 may store decoded pixel block data of each picture as it is coded for use in intra prediction. The reference picture store 1040 also may store decoded reference pictures.

As discussed, the predictor 1060 may supply the transformed reference block data to the pixel block decoder 1020. The predictor 1060 may supply predicted pixel block data as determined by the prediction reference indicators supplied in the coded video data stream.

The controller 1070 may control overall operation of the coding system 1000. The controller 1070 may set operational parameters for the pixel block decoder 1020 and the predictor 1060 based on parameters received in the coded video data stream. As is relevant to the present discussion, these operational parameters may include quantization parameters $Q_P$ for the dequantizer 1024 and transform modes M for the inverse transform unit 1015. As discussed, the received parameters may be set at various granularities of image data, for example, on a per pixel block basis, a per picture basis, a per slice basis, a per LCU basis, or based on other types of regions defined for the input image.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic-and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several embodiments of the disclosure are specifically illustrated and/or described herein. However, modifications and variations of the disclosure are covered by the above teachings and within the purview of the appended claims without departing from the spirit and intended scope of the disclosure.

We claim:

1. A method comprising:
generating, by a first terminal, a video stream;
distinguishing, by an analyzer, foreground pixels of a frame of the video stream representing a foreground element from background pixels of the frame representing a background element;
responsive to information representing a viewing condition at a second terminal, creating, by the analyzer, a modified video frame by compositing the foreground pixels and the background pixels including a shift in the relative positions of the foreground pixels and the background pixels; and
transmitting the modified video frame to the second terminal.

2. The method of claim 1, wherein the modifying the frame of the video stream by shifting the foreground element relative to the background element is further responsive to depth information representing a relative depth between the foreground element and the background element in the frame of the video stream.

3. The method of claim 1, wherein the information representing the viewing condition at the second terminal comprises an indication of a change in relative positions of the second terminal and an operator of the second terminal.

4. The method of claim 1, wherein the information representing the viewing condition at the second terminal comprises a relative rotation of the second terminal with respect to an operator of the second terminal.

5. The method of claim 1, wherein:
the information representing the viewing condition at the second terminal comprises at least one of: a side-to-side movement of the second terminal with respect to an operator of the second terminal and a rotation of the second terminal about a longitudinal axis of the second terminal; and
the shift of the foreground element relative to the background element comprises a horizontal shift of the foreground element relative to the background element.

6. The method of claim 1, wherein the information representing the viewing condition at the second terminal comprises an input to a touch-sensitive display of the second terminal.

7. The method of claim 1, further comprising deriving new content for a background element of the frame revealed by the shifting from content of other frame(s) of the video stream.

8. The method of claim 7, wherein:
the video stream is captured by two or more cameras; and
the portion of the background element without image content is filled in, at least in part, with image content captured from the two or more cameras.

9. The method of claim 7, further comprising:
estimating an amount of background content that can be derived for the frame based on identified background content for other frame(s) of the video stream; and
determining a distance of the shifting based on the estimated amount of background content that can be derived.

10. The method of claim 2, wherein the depth information is determined based at least in part on data from a depth sensor associated with the first terminal.

11. The method of claim 2, wherein the depth information is determined from analysis of the video stream.

12. The method of claim 1, wherein the video stream is captured in part by a camera.

13. The method of claim 1, wherein the video stream includes synthetic video data at least in part.

14. A method comprising:
receiving, by a terminal, a video stream;
distinguishing, by the terminal, foreground pixels representing a foreground element in a frame of the video stream from background pixels representing a background element of the frame;
responsive to information representing a viewing condition at the terminal, modifying, by the terminal, the frame by compositing the foreground pixels and the background pixels including a shift in the relative positions of the foreground pixels and the background pixels; and
displaying the modified video frame.

15. The method of claim 14, wherein the viewing condition information is entered at a motion sensor of the terminal.

16. The method of claim 14, wherein the viewing condition information is entered at a camera of the terminal.

17. The method of claim 14, wherein the viewing condition information is entered at a touch screen of the terminal.

18. The method of claim 14, wherein the video stream is received as coded video data and the method comprises decoding by the terminal the coded video data.

19. The method of claim 18, wherein the distinguishing is performed, at least in part, with reference to metadata provided with the coded video data identifying depth of content elements of the video stream.

20. An apparatus comprising:
an image source generating a video sequence;
an image analyzer, responsive to depth indicators associated with the video sequence, to parse frames of the video sequence into pixels of foreground and background content elements;
a compositor, responsive to data indicating a viewing condition at a display terminal, to shift the pixels of a foreground element of a frame with respect to the pixels of a background element of the same frame; and
a transmitter to transmit the shifted frame to the display terminal.

21. The apparatus of claim 20, wherein the compositor derives new content for a background element of the frame revealed by the shifting from content of other frame(s) of the video stream.

22. The apparatus of claim 20, wherein the compositor:
estimates an amount of background content that can be derived for the frame based on identified background content for other frame(s) of the video stream; and
determines a distance of the shifting based on the estimated amount of background content that can be derived.

23. The apparatus of claim 20, further comprising a depth sensor, wherein the depth information is determined based at least in part on data from the depth sensor.

24. The apparatus of claim 20, wherein the depth information is determined from analysis of the image analyzer.

25. The apparatus of claim 20, wherein the image source includes a camera.

26. The apparatus of claim 20, wherein the image source includes an application executing on a computer.

27. A computer-readable medium having instructions that, when executed by a processor, effectuate operations comprising:
generating, by a first terminal, a video stream;
distinguishing, by the first terminal, foreground pixels representing a foreground element in a frame of the video stream from background pixels representing a background element of the frame;
receiving an operator input from a second terminal;
responsive to information representing a viewing condition at a second terminal, creating, by the first terminal, a modified video frame by compositing the foreground pixels and the background pixels including a shift in the relative positions of the foreground pixels and the background pixels; and
transmitting the modified video frame to the second terminal.

28. An apparatus comprising:
a receiver to receive a video stream from a network;
an image analyzer, responsive to depth indicators associated with the video stream, to parse frames of the video stream into pixels of foreground and background content elements;
a compositor, responsive to data indicating a viewing condition at a display, to shift the pixels of a foreground element of a frame with respect to the pixels of a background element of the same frame; and
the display displaying video data output by the compositor.

29. The apparatus of claim 28, further comprising a position sensor associated with the display, wherein the viewing condition information is entered at the position sensor.

30. The apparatus of claim 28, further comprising a camera associated with the display, wherein the viewing condition information is entered at the camera.

31. The apparatus of claim 28, wherein the display is a touch-screen display, wherein the viewing condition information is entered at the touch screen.

32. The method of claim 1, wherein the shift in relative position emulates a perspective shift caused by an emulated movement of a camera capturing the video stream, and the emulated movement is determined by the information representing the viewing condition.

33. A method comprising:
identifying a foreground portion and a background portion of a first digital image in a video stream captured by a camera at a source location;
responsive to an indication of a change in a viewing condition at a destination terminal, creating a second digital image by compositing the foreground portion of the first digital image and the background portion of the first digital image by including a change a position of the background portion relative to a position of the foreground portion;
modifying the video stream by replacing the first digital image with the second digital image; and
transmitting the modified video stream to the destination terminal.

34. A method comprising:
receiving, at a destination terminal, a digital video stream captured by a camera at a source location;
identifying a foreground portion and a background portion of a first digital image in the digital video stream;
responsive to an indication of a change in a viewing condition at the destination terminal, creating a second digital image by compositing the foreground portion of the first digital image and the background portion of the first digital image by including a change a position of the background portion relative to a position of the foreground portion;
modifying the video stream by replacing the first digital image with the second digital image; and
presenting the modified video stream at the destination terminal.

* * * * *